United States Patent [19]
Harmsen

[11] Patent Number: 6,132,007
[45] Date of Patent: Oct. 17, 2000

[54] WHEEL WEIGHT SYSTEM

[76] Inventor: Wayne A. Harmsen, 180 River La., St. Cloud, Wis. 53079

[21] Appl. No.: 09/133,360

[22] Filed: Aug. 13, 1998

[51] Int. Cl.[7] .................................................... B60B 15/28
[52] U.S. Cl. ........................................................ 301/53.5
[58] Field of Search ........................... 301/53.5; 280/758, 280/759, 755

[56] References Cited

U.S. PATENT DOCUMENTS

| | | | |
|---|---|---|---|
| 2,243,380 | 5/1941 | Kinney | 301/53.5 |
| 2,988,401 | 6/1961 | Matz | 301/53.5 |
| 3,314,728 | 4/1967 | Cross | 301/53.5 |
| 4,305,621 | 12/1981 | Snell et al. | 301/53.5 X |

Primary Examiner—Russell D. Stormer
Attorney, Agent, or Firm—Donald Cayen

[57] ABSTRACT

A wheel weight system adds traction to the drive wheels of off-road motor vehicles. The wheel weight system comprises at least two adapters that are mounted to a drive wheel. Studs are threaded into free ends of the adapters. Holes in a wheel weight are slipped over the studs. Nuts on the free ends of the studs attach the wheel weight in place. The adapters may be separate pieces that are removeably mounted to the drive wheel. Those adapters can remain more or less permanently on the drive wheel, if desired, even after the wheel weight and studs are removed from the adapters. Alternately, the adapters may be welded or cast integral with the drive wheel.

14 Claims, 3 Drawing Sheets

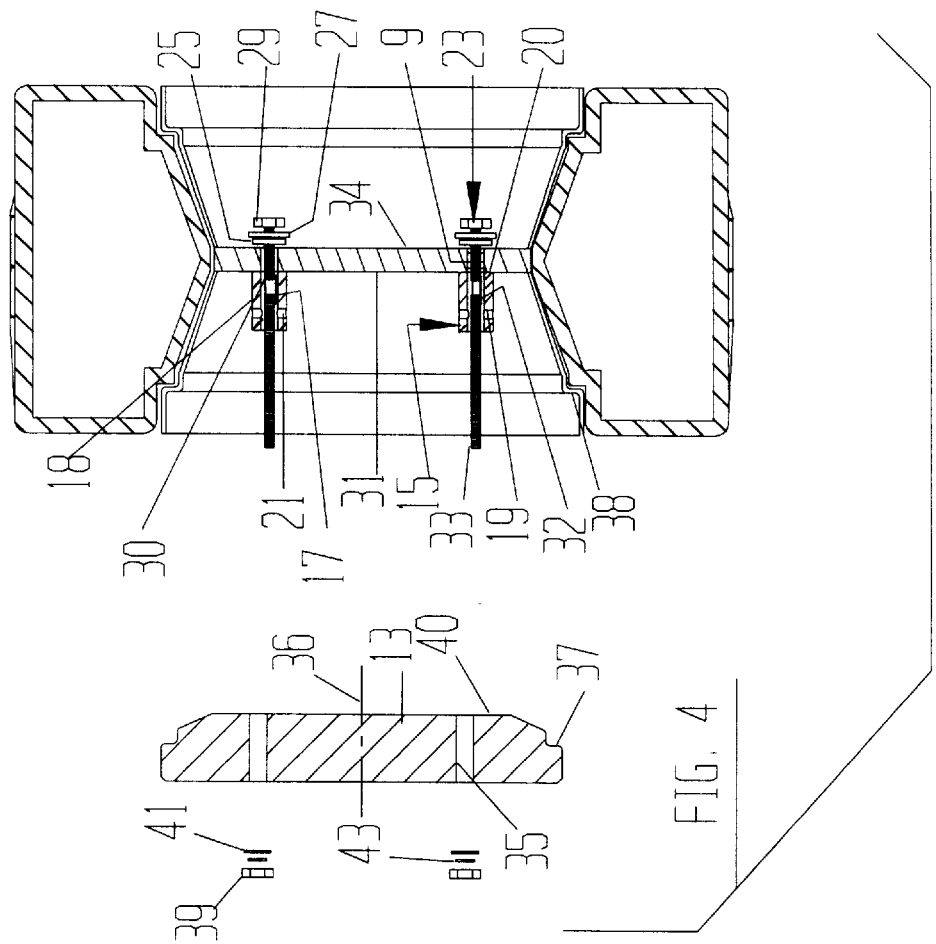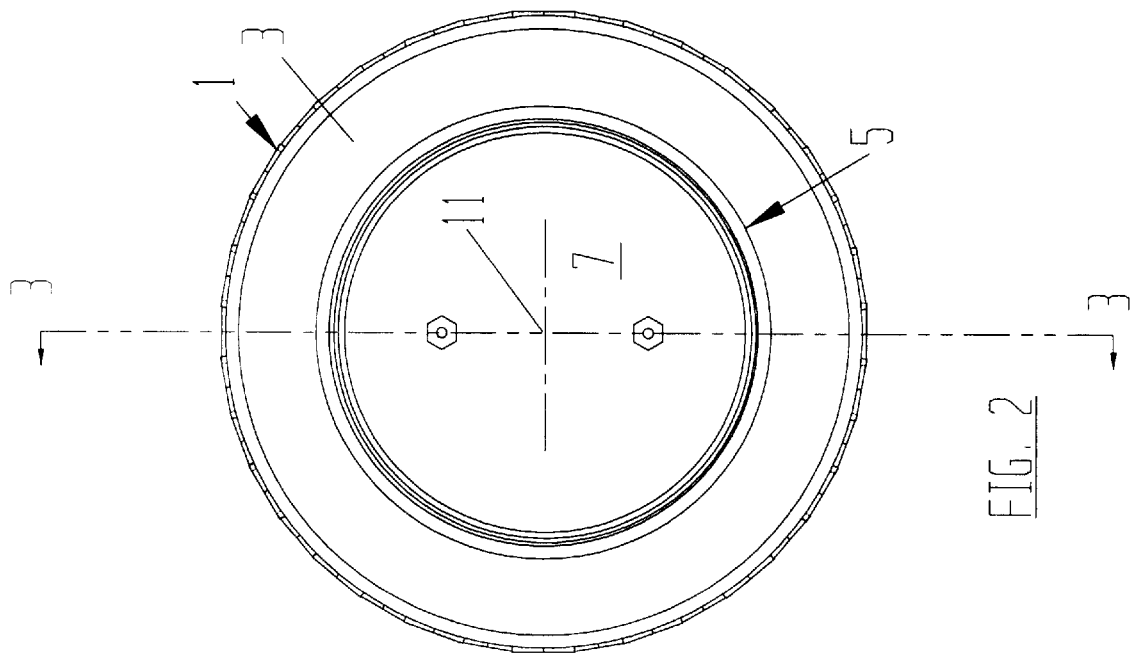

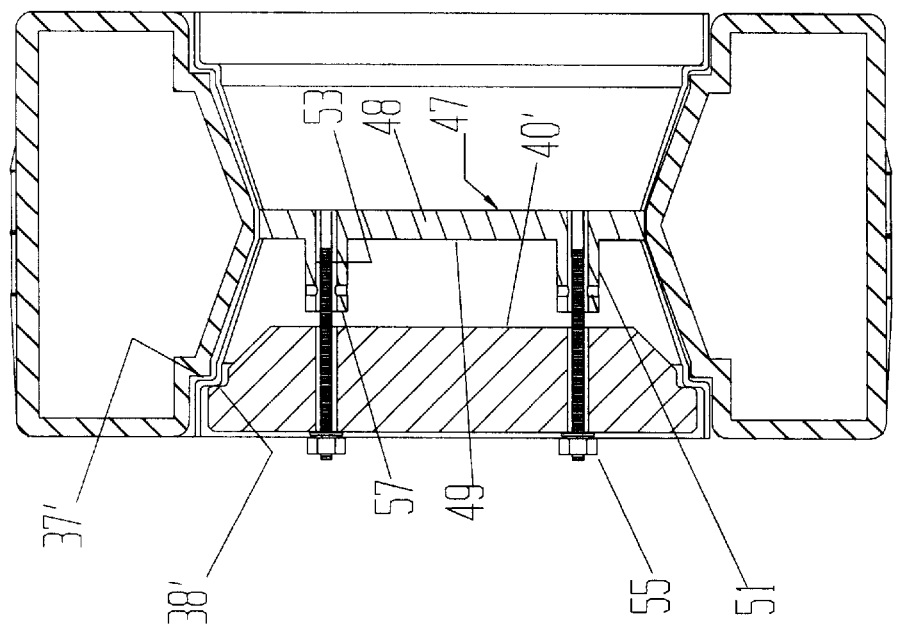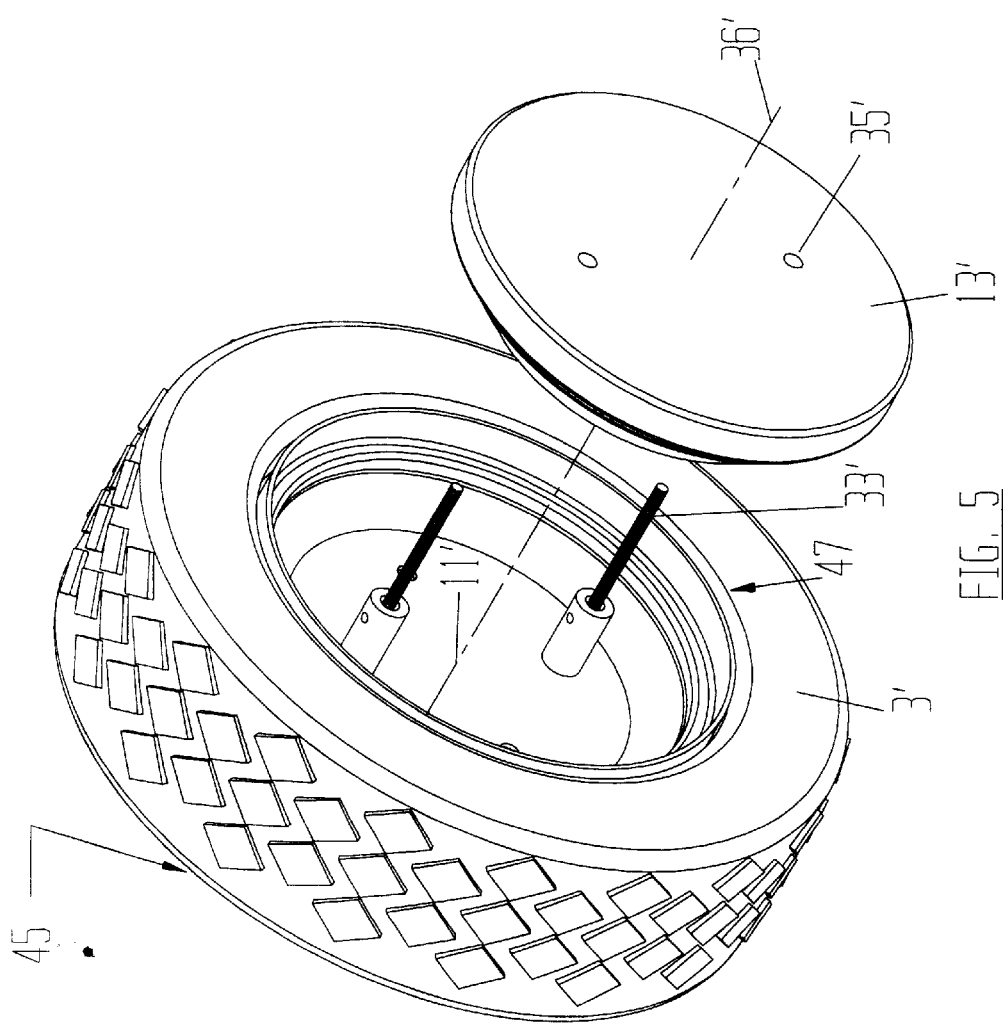

WHEEL WEIGHT SYSTEM

BACKGROUND OF THE INVENTION

1. Field of the Invention

This invention pertains to small automotive vehicles, and more particularly to apparatus for increasing the traction of the vehicle drive wheels.

2. Description of the Prior Art

Lawn and garden tractors, all-terrain vehicles, and similar off-road vehicles enjoy widespread popularity. One reason for the popularity of lawn and garden tractors is that they can be equipped with a wide variety of accessories and attachments. Snow throwers, rotary brushes, and lawn mowers are typical attachments. Large model tractors can be equipped with scraper blades.

Blowing or plowing snow, however, presents a problem for lawn and garden tractors. Because of their relatively small diameter drive wheels and light weight, the tractors can get stuck rather easily in deep snow. To solve that problem, it is known to put chains on the drive wheels in winter. Putting chains on tires is a tedious job, especially when the weather is cold. Removing the chains is not much easier.

It is also known to add large weights to the drive wheels of lawn and garden tractors. That expedient is a time consuming, difficult, and even dangerous chore. The wheel weights are used in combination with two or more long bolts. The bolts are inserted through holes in the wheel rim from the inside of the rim such that the bolt shanks extend outwardly from the outside of the rim. Because of the thin wall of the rim and the clearance around the bolt shanks, the bolts tilt downwardly by gravity unless supported by an external force.

To attach the wheel weight, a person must slip holes in the weight over the bolts. That is very difficult to do. The person must first lift and hold the weight, which can weigh as much as 40 to 50 pounds, while he simultaneously tries to align the weight holes with the bolts. The procedure requires that he use his legs to help hold the weight with one hand as he maneuvers the bolts with the other hand. After the bolts are initially inserted into the weight holes, the person must push the wheel weight over the bolts toward the wheel. Doing so invariably pushes the bolts in the same direction. To prevent bolt motion, the person must reach with one hand around the inside of the wheel to hold the bolts in place while he tries to push the wheel weight with his leg, knee, or other hand. Resting often, he ultimately is able to get one bolt all the way through its hole in the weight. In the meantime, the second bolt has pushed at least partially out of its hole in the rim. The person must therefore push that bolt back through the weight, again by reaching behind the wheel with one hand while holding the weight with the other hand or a leg. Finally, after considerable effort and time, both bolts are properly in place through the weight. Nuts are tightened on the bolt ends, and the tractor is ready for operation. In spring, the weights are removed, only to have to be laboriously reinstalled the next winter.

Thus, a need exists for improvements in tractor wheel weights.

SUMMARY OF THE INVENTION

In accordance with the present invention, a wheel weight system is provided that greatly simplifies the task of attaching large weights to lawn and garden tractors, all-terrain vehicles, and other off-road vehicles. This is accomplished by apparatus that includes a pair of adapters on the outside of the vehicle drive wheel rims.

The tractor drive wheel is conventional in every way. That is, the wheel rim has at least two through holes 180 degrees apart and a central disk section of a diameter suitable for a variety of commercially available wheel weights.

The wheel weight system comprises two or more screws, one inserted through each hole of the rim disk section and protruding outwardly from the disk section outside surface. The adapter of the invention is tubular in shape having an inner diameter that is threaded between the adapter two ends. The adapter may have a round outer periphery, in which case a cross hole is drilled through the adapter walls.

One end of each adapter is turned onto the exposed threads of the associated screws. The minimal weight of the adapters enables a person to easily hold them in place while the screws are tightened to draw the adapters against the rim disk section outer surface. The screw shanks and the adapters are so dimensioned that the screws do not extend more than half way into the adapters. The adapters can be left in place on the wheel rim throughout the year.

When a person wants to add weights to the tractor wheels, he turns a long stud into each adapter. Then he lifts the wheel weight and aligns the holes in it with the two studs. Then he slides the weight over the studs and up against the wheel rim. Finally, he tightens nuts on the exposed ends of the studs to attach the weights to the rim. The entire process is accomplished in a few minutes and with great ease compared with the prior method. When it is time to take the weights off, the process is reversed.

In a modified embodiment of the invention, the outer surface of the vehicle wheel rim disk section is fabricated with integral adapters 180 degrees apart. The integral adapters are tapped to receive the studs. The function of the integral adapters is identical to the function of the separate adapters described previously.

The method and apparatus of the invention, using long studs threaded into adapters on tractor drive wheels, thus provides increased traction for lawn and garden tractors and other off-road vehicles. The wheel weights are easily put on and removed, even though the weights are heavy and awkward to handle.

Other advantages, benefits, and features of the present invention will become apparent to those skilled in the art upon reading the detailed description of the invention.

BRIEF DESCRIPTION OF THE DRAWINGS

FIG. 2 is a front view of a wheel with a wheel weight attached thereto.

FIG. 4 is a view similar to FIG. 3, but showing some of the components in exploded form.

FIG. 5 is a view similar to FIG. 1, but showing a modified embodiment of the invention.

FIG. 6 is a view similar to FIG. 3, but showing the modified embodiment of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 3:
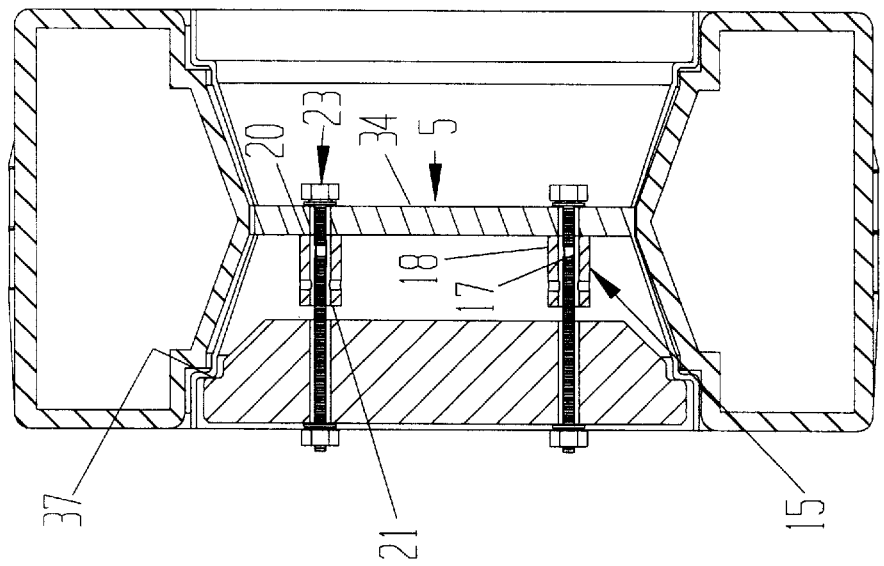
FIG. 3 is a cross sectional view taken along line 3—3 of FIG. 2.
Figure 1:
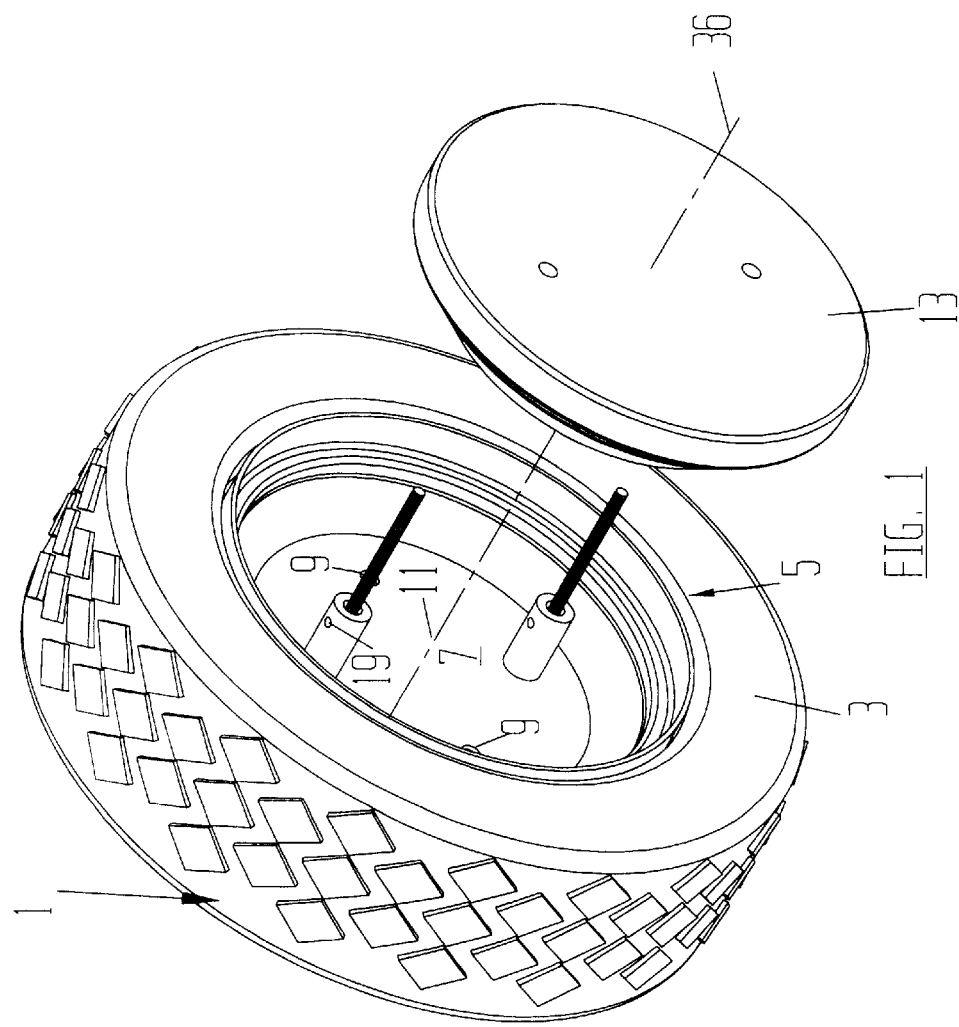
FIG. 1 is an exploded perspective view of a typical tractor wheel with the adapter of the invention mounted to it and a typical wheel weight ready to be attached to the wheel.

Referring to FIGS. 1–4, a typical wheel 1 is illustrated that includes the present invention. The wheel 1 may be a drive wheel of a lawn and garden tractor, not shown. However, it will be understood that the invention is not limited to use with hobby-type vehicles.

The particular wheel 1 shown has a pneumatic tire 3 made of rubber or other suitable material. The tire 3 mounts on a rim 5 as is well known in the art. The rim 5 includes a generally flat central disk section 7. At least one and often two or more pairs of through holes 9 are formed in the rim disk section 7. The holes 9 of each pair are spaced 180 degrees apart about the wheel longitudinal axis 11.

Reference numeral 13 represents a typical wheel weight that is to be attached to the wheel 1. The purpose of the wheel weight 13 is to provide additional traction to the tire 3 in winter conditions. A well known wheel weight is one manufactured by B & B Industries of Elton, Pa. Such a weight weighs approximately 30 pounds.

In accordance with the present invention, the wheel weight 13 is attached to the wheel 1 in a safe and easy manner. For that purpose, the invention includes a pair of adapters 15 that are more or less permanently mounted to the wheel rim 5. Each adapter 15 is comprised of a tube that may be approximately two inches long between a first end 20 and a second end 21. The interior 17 of the tube is threaded through, as with ½-13 threads. The adapter outer periphery 18 may be round, as is shown in the drawings. A suitable outer diameter for a round adapter is approximately one inch. There is a cross hole 19 extending diametrically through the adapter. The cross hole 19 is closer to the adapter second end 21 than to the first end 20. The adapter may have opposed flats on the outer periphery instead of the cross hole 19. Alternately, the adapter outer periphery may be hex shaped. The adapter is preferably made from a non-corrodible material, such as aluminum, a hard plastic, or treated and painted steel.

The adapter 15 is mounted to the wheel disk section 7 by placing one adapter end 20 against the disk section outer surface 31. Screws 23 are easily pushed through associated holes 9 in the wheel disk section from the inside of the wheel 1. To prevent the screws 23 from coming loose, a flat washer 25 and lock washer 27 are interposed between the screw head 29 and the disk section inner surface 34. The screw 23 is turned tightly into the adapter threads 17. The cross hole 19 aids in tightening the screw by receiving a rod or similar tool that enables the adapter to be held against turning when the screw 23 is tightened. The length of the screw 23 is chosen such that its free end 30 does not extend more than half the way into the adapter. The location of the cross hole close to the adapter second end 21 assures that the rod or other tool does not interfere with the screw 23. When the adapters are in place, they can be left on the wheel indefinitely. The presence of the adapters has no effect on the performance of the tractor.

When it is desired to attach a weight 13 to the wheel 1, one end 32 of a long stud 33 is threaded into each adapter 15. The studs 33 are turned into the adapters until the stud ends 32 contact the associated screws 23. The wheel weight is rolled or otherwise brought close to the wheel. The weight is rotated such that the mounting holes 35 therein have the same angular orientation about the weight longitudinal axis 36 as the orientation of the wheel disk section holes 9 about the wheel longitudinal axis 11. Then the person lifts the weight. The holes 35 are placed coaxially with the studs 33. The weight is pushed such that the holes 35 pass over the studs until the weight annular surface 37 contacts the surface 38 of the wheel rim 5. At that point, there preferably is clearance between the weight end surface 40 and the ends 21 of the adapters 15. The firm and steady position of the studs makes it an easy task to align the weight holes with the studs and to push the weight over the studs, which support the weight. When the weight is in place adjacent the wheel rim surface 38, a nut 39, flat washer 41, and lock washer 43 are turned onto each stud. When the nuts 39 are tightened, the weight is drawn against the wheel rim and securely attached to the wheel.

The wheel weights 13 add considerable traction to the tractor wheels 1 when plowing snow and performing similar jobs. The weights can be left on the wheels indefinitely. Usually, however, they are removed in the spring. To do so, the nuts 39 and washers 41 and 43 are removed from the studs 33. The weights are pulled off the studs and placed on the ground. The studs are removed from the adapters 15. The weights, studs, nuts, and washers are then stored until needed again. The adapters can remain on the wheels all summer.

Further in accordance with the present invention, the adapters can be made integral with the tractor wheels. Looking at FIG. 5 and 6, a wheel 45 has a tire 3' mounted to a wheel rim 47. The wheel rim 47 has a flat central disk section 48 with an outer surface 49. Integral with the wheel rim 47 are a pair of adapters 51. The adapters 51 may be cast with the wheel rim if the rim is a casting. Alternately, as shown, the adapters may be welded to the central disk section 48. In either case, the adapters are tapped through as shown at reference numeral 53. The tapped holes 53 are alignable with the holes 35' in the wheel weight 13'.

To attach the wheel weights 13' to the wheel 45, a stud 33' is threaded into the tapped holes 53 of the two adapters 51. The holes 35' in the wheel weight are aligned with the studs 33' and then pushed over the studs. Nuts and washers 55 are threaded onto the studs to draw the wheel weight surface 37' against the wheel rim surface 38'. When the wheel weight is firmly attached in place, there preferably is clearance between the weight surface 40' and the ends 57 of the adapters. The wheel weights 13' are removed from the wheel 45 in the same manner as with the separate adapters 15 described previously in connection with FIGS. 1–4.

In summary, the results and advantages of lawn and garden tractors can now be more fully realized. The wheel weights 13 provide increased traction to the tractor wheels 1 without requiring excessive exertion or difficulty to the person who must attach them to the wheels. This desirable result comes from using the combined functions of the adapters and the studs. The separate adapters 15, being of small size and length and light weight, are easily mounted to the wheel rim disk section 7 despite the fact that the screws 23 are assembled from the insides of the wheels. The separate adapters 15 and the integral adapters 45 receive the studs and hold them fixed in place. The holes 35 in the wheel weights can thus be easily aligned with the studs for sliding the weights on the studs and up against the wheel rim. Nuts hold the weights securely in place until it is desired to take the weights off. The separate adapters 15 can remain on the wheels, ready to receive the studs when the weights are needed again.

It will also be recognized that in addition to the superior performance of the adapters, their construction is such as to be of almost negligible cost in relation to the benefits they provide. Also, because they are made of a simple and rugged design, the adapters give long service life with minimal attention.

Thus, it is apparent that there has been provided, in accordance with the invention, a wheel weight system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations of the invention as fall within the spirit and broad scope of the appended claims.

What is claimed is:

1. A wheel weight system for use on a motor vehicle wheel having a wheel disk section with at least one pair of holes therethrough, the wheel weight system comprising:
  a. at least one pair of adapters each having an outer periphery, a threaded interior, a first end in contact with the wheel disk section, and a second end;
  b. at least one pair of screws, each screw having a shank passing through a hole in the wheel disk section and being threaded into the first end of a respective adapter to mount the adapter to the wheel disk section;
  c. at least one pair of studs, each stud being turned into the second end of a respective adapter;
  d. a wheel weight supported on the studs and in contact with the vehicle wheel; and
  e. at least two nuts, each being turned onto a stud to securely attach the wheel weight to the wheel.

2. The wheel weight system of claim 1 wherein:
  a. the adapter has a round outer periphery; and
  b. each adapter defines at least one cross hole extending diametrically through the adapter.

3. The wheel weight system of claim 2 wherein the cross hole is closer to the adapter second end than to the first end.

4. The wheel weight system of claim 1 wherein there is a clearance between the wheel weight and the adapter second end when the wheel weight is attached to the vehicle wheel.

5. In combination:
  a. a motor vehicle having at least one drive wheel including a disk section with inside and outside surfaces;
  b. a pair of threaded adapters on the outside surface of the drive wheel disk section;
  c. a pair of studs each having a first end threaded into an associated adapter and a second end;
  d. a wheel weight having holes therethrough that receive the studs; and
  e. a pair of nuts threaded onto the second ends of the studs, so that the studs and adapters support the wheel weight on the motor vehicle drive wheel.

6. The combination of claim 5 wherein:
  a. the adapters are removeably mounted to the drive wheel disk section; and
  b. the studs and wheel weights are selectively attachable to and removable from the drive wheel without removing the adapters from the drive wheel.

7. The combination of claim 5 wherein the wheel weight is in contact with the drive wheel when the nuts are turned onto the second ends of the studs.

8. The combination of claim 5 wherein the adapters are integral with the drive wheel disk section.

9. A method of increasing the traction of a motor vehicle drive wheel comprising the steps of:
  a. mounting a pair of adapters each having a threaded opening to the drive wheel;
  b. threading a pair of threaded studs into the threaded openings of the respective adapters;
  c. supporting a wheel weight on the studs; and
  d. securing the wheel weight to the studs.

10. A method of increasing the traction of a motor vehicle drive wheel comprising the steps of:
  a. permanently mounting a pair of adapters each having a threaded opening to the drive wheel;
  b. threading a pair of threaded studs into the threaded openings of the respective adapters;
  c. supporting a wheel weight on the studs; and
  d. securing the wheel weight to the studs.

11. The method of claim 10 comprising the further steps of:
  a. sliding the wheel weight off the studs; and
  b. removing the studs from the adapters, so that the wheel weight can be removed from the drive wheel without removing the adapters from the drive wheel.

12. A method of attaching a wheel weight to the drive wheel of a motor vehicle comprising the steps of:
  a. mounting at least two adapters each having a threaded opening therethrough to the drive wheel;
  b. threading a first end of a respective threaded stud into the threaded opening of each adapter;
  c. sliding the wheel weight over the studs and into contact with the drive wheel; and
  d. turning a nut on a second end of each stud and thereby securing the wheel weight to the drive wheel.

13. A method of attaching a wheel weight to the drive wheel of a motor vehicle comprising the steps of:
  a. mounting at least two adapters each having a threaded opening therethrough to the drive wheel, wherein the step of mounting at least two adapters to the drive wheel comprises the steps of:
    i. placing a first end of each adapter against an outside surface of a central disk section of the drive wheel; and
    ii. threading a screw through the central disk section of the drive wheel and into a first end of each adapter and thereby mounting the adapters to the central disk section with the screws;
  b. threading a first end of a respective threaded stud into the threaded opening of each adapter;
  c. sliding the wheel weight over the studs and into contact with the drive wheel; and
  d. turning a nut on a second end of each stud and thereby securing the wheel weight to the drive wheel.

14. A method of attaching a wheel weight to the drive wheel of a motor vehicle comprising the steps of:
  a. mounting at least two adapters each having a threaded opening therethrough to the drive wheel, wherein the step of mounting at least two adapters to the drive wheel comprises the step of welding or casting each adapter integral with a central disk section of the drive wheel;
  b. threading a first end of a respective threaded stud into the threaded opening of each adapter;
  c. sliding the wheel weight over the studs and into contact with the drive wheel; and
  d. turning a nut on a second end of each stud and thereby securing the wheel weight to the drive wheel.

* * * * *